(12) United States Patent
Howard

(10) Patent No.: US 7,324,205 B2
(45) Date of Patent: Jan. 29, 2008

(54) OPTICAL ACCELEROMETER, GRAVITOMETER, AND GRADIOMETER

(75) Inventor: Robert J. Howard, Clifton, VA (US)

(73) Assignee: Lockheed Martin Corporation, Bethesda, MD (US)

(*) Notice: Subject to any disclaimer, the term of this patent is extended or adjusted under 35 U.S.C. 154(b) by 357 days.

(21) Appl. No.: 11/039,671

(22) Filed: Jan. 21, 2005

(65) Prior Publication Data
US 2006/0164648 A1 Jul. 27, 2006

(51) Int. Cl.
*G01B 9/02* (2006.01)
*G01P 15/08* (2006.01)
*G01P 15/13* (2006.01)
*G01P 3/36* (2006.01)

(52) U.S. Cl. .................. 356/450; 356/28.5; 73/514.27
(58) Field of Classification Search ............... 356/28.5, 356/450, 477, 483; 73/514.01, 514.16, 514.26, 73/514.27
See application file for complete search history.

(56) References Cited

U.S. PATENT DOCUMENTS

| | | | |
|---|---|---|---|
| 4,671,658 A * | 6/1987 | Shaw et al. ................. 356/460 |
| 4,707,136 A | 11/1987 | Kim | |
| 4,740,083 A * | 4/1988 | Curby et al. ................ 356/473 |
| 4,900,918 A * | 2/1990 | Killian ..................... 73/514.27 |
| 4,962,987 A | 10/1990 | Doran | |
| 5,061,069 A * | 10/1991 | Califano ..................... 356/477 |
| 5,898,720 A | 4/1999 | Yamamoto et al. | |
| 6,028,873 A | 2/2000 | Yamamoto et al. | |
| 6,034,770 A * | 3/2000 | Kim et al. .................... 356/459 |
| 6,426,831 B1 | 7/2002 | Schmidt et al. | |
| 6,567,174 B1 | 5/2003 | Barker et al. | |
| 6,813,006 B1 * | 11/2004 | Wang et al. ................... 356/28 |
| 6,886,404 B2 * | 5/2005 | Dignonnet et al. ......... 73/514.27 |
| 2003/0076865 A1 | 4/2003 | Chang-Hasnain et al. | |

FOREIGN PATENT DOCUMENTS

WO   WO91/02444   2/1991

* cited by examiner

*Primary Examiner*—Patrick Connolly
(74) *Attorney, Agent, or Firm*—Mark A. Wurm

(57) ABSTRACT

An optical accelerometer, gravitometer, and gradiometer have a light source, a beam splitter, a light medium, and a plurality of mirrors. The light beam from the light source is split into two beams that counter-propagate through the accelerometer. The acceleration experienced by the accelerometer causes a phase shift in the beams, and this phase shift is used to calculate the acceleration.

24 Claims, 8 Drawing Sheets

OPTICAL ACCELEROMETER, GRAVITOMETER, AND GRADIOMETER

TECHNICAL FIELD

The invention relates to accelerometers, gravitometers, and gradiometers, and in particular, optical accelerometers, gravitometers, and gradiometers.

BACKGROUND

Accelerometers measure acceleration, and gravitometers and gradiometers measure the acceleration of gravity, generally by measuring the displacement of a mass when it is acted upon by the acceleration. In the case of a classical accelerometer, the displacement of a proof mass suspended by a pair of springs is measured. This displacement is proportional to the acceleration and can be sensed and scaled to provide an indication of the magnitude of the acceleration. In the case of gravitometers, instruments have been constructed that measure the free fall time of a mass, the period of a pendulum, and small shifts in an excited quantum state. Ring laser gyroscopes have been used to measure angular acceleration, but optical means of measuring linear acceleration have not been practical.

For example, a Michelson-Morley (FIG. 1) or a Mach-Zender (FIG. 2) interferometer, in principle, could be used to measure acceleration. This follows from the fact that an acceleration changes the wavelength of light according to the principles of general relativity and optics.

Specifically, interferometers are designed to measure small optical path length changes. This is accomplished by splitting a light beam into two beams, sending each beam through a different path and then recombining the beams. If the beams encounter different optical path lengths they will arrive with slightly different delays. If the difference in optical paths is an even number of wavelengths of the light constructive interference occurs; if it is an odd number of wavelengths of the light destructive interference results. A continuum exists between these extremes, with constructive interference producing the strongest output signal and destructive interference the weakest (ideally none). Pictorially, one can imagine two sine waves being added as they slide past one another. When the positive peaks align the output is a sine wave of double amplitude, whereas when the positive peaks of the first sine wave aligns with negative peaks of the second sine wave the output goes to zero. Depending on the interferometer design, the interference pattern can produce a "bulls-eye" pattern or a series of dark and light bands due to differences in optical path length across the aperture of the interferometer.

Figure 1:
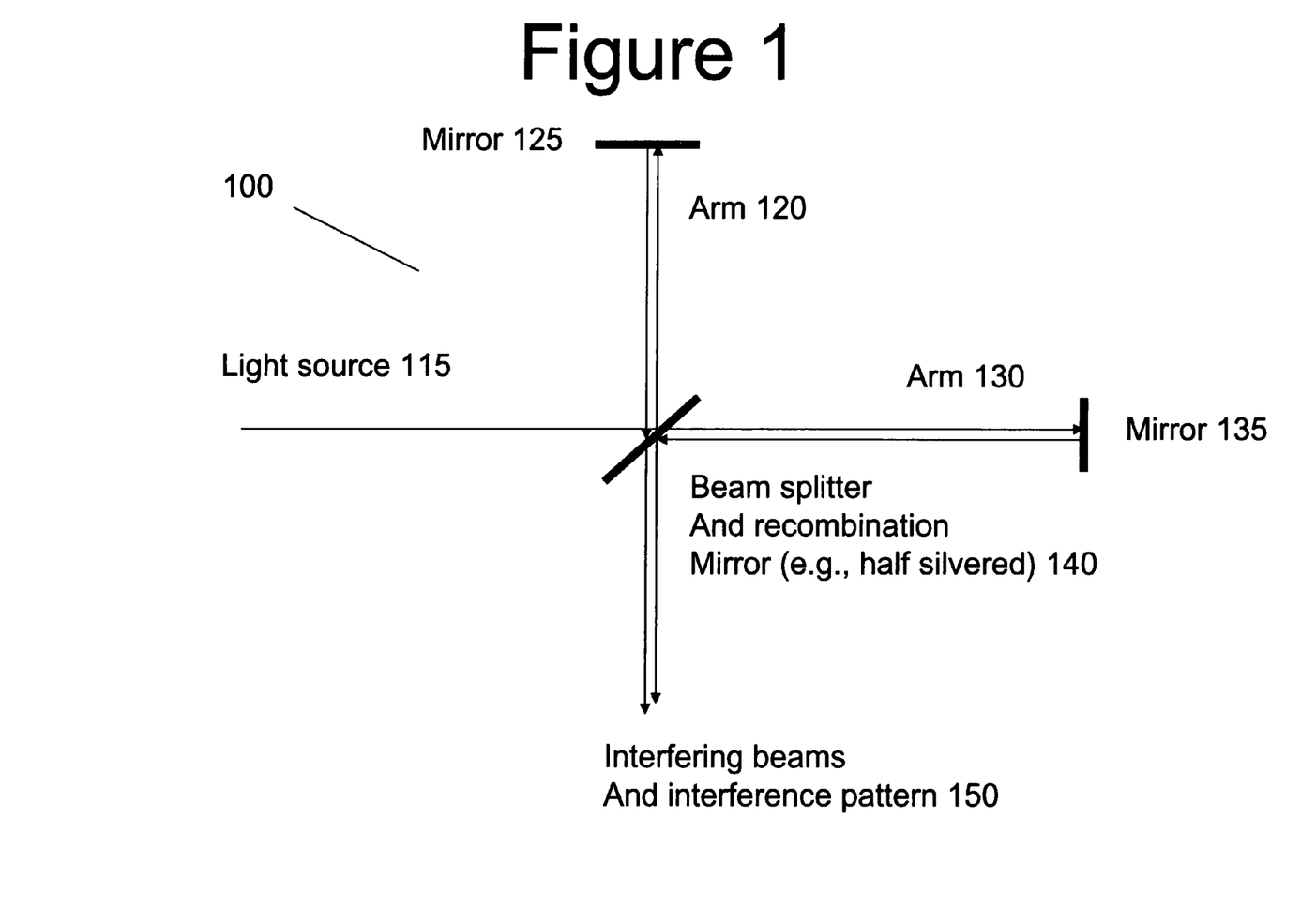
FIG. 1 illustrates an example of a Michelson-Morley interferometer.
Figure 2:
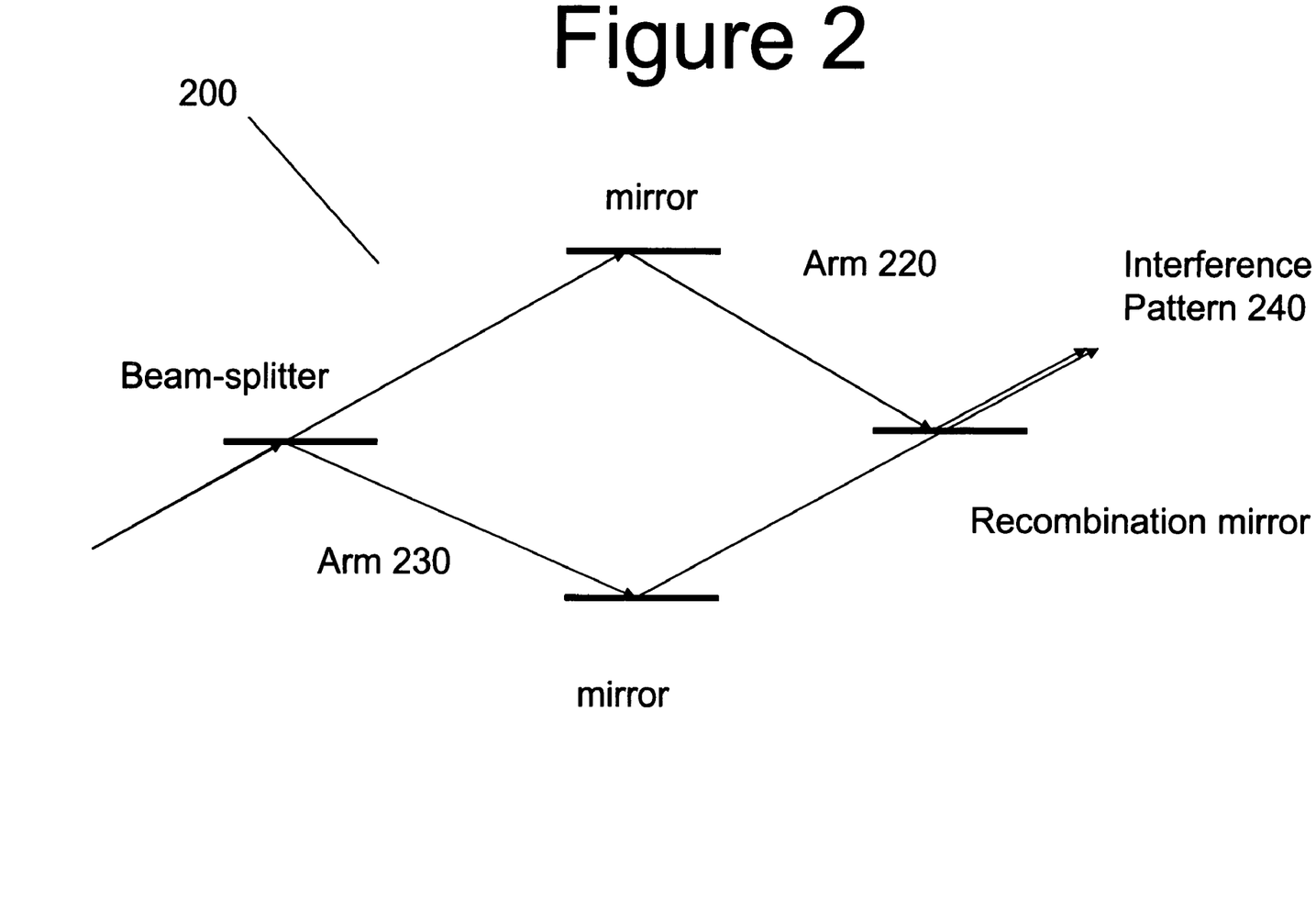
FIG. 2 illustrates an example of a Mach-Zender interferometer.

Referring to FIG. 1, and assuming that the interferometer is accelerating from left to right, light traveling in arm 120 of the Michelson-Morley interferometer 100 will experience acceleration normal to the beam, while light traveling in arm 130 will experience acceleration along the beam. Relativistic effects will cause a minute wavelength shift between the two arms and in principle acceleration could be measured. However, the symmetry of the Michelson-Morley interferometer results in cancellation of first order acceleration effects, reducing the sensitivity of the device. That is, the beam traveling along arm 130 travels first in the direction of the acceleration, and then, after reflecting off of mirror 135, travels in the opposite direction in the arm, thereby canceling the first order acceleration effects.

Similarly, a Mach-Zender interferometer 200 (FIG. 2) can in principle measure acceleration gradients or gravitational field gradients. With this interferometer the light in arm 220 experiences a slightly different average gravitational field than the light in arm 230. This results in minuscule differences in wavelength between the two beams and thus an interference pattern at 240. This particular configuration has been used successfully to measure gravitational gradients using quantum interference between neutrons (as opposed to photons.) The neutrons have wavelengths (DeBrogle waves) that are many orders of magnitude shorter than light or even x-rays. This allows a measurable signal to be produced.

A problem with the Michelson-Morley and Mach-Zender interferometers is that for normally encountered gravitational fields, accelerations, and interferometer dimensions, the wavelength shifts and resulting interference shifts for optical interferometers are too small to measure using optical means.

SUMMARY

In an embodiment, the invention is an optical accelerometer, gravitometer, or gradiometer. It has a light source (such as a laser), an optical path, and an instrument to detect a phase shift (such as a photocell). In some embodiments, the optical path has placed within it a slow light medium. A light pulse is propagated into and through the accelerometer, split into two segments, and then preferably counter propagated through the system. An acceleration in the system causes a phase shift in the two beams. This phase shift is measured, and this measurement is used to calculate the acceleration. In another embodiment, classical optical media are used in conjunction with multiple passes of the light through the accelerometer. The invention can also be used as a gravitometer or gradiometer. In another embodiment, a feedback loop is introduced into the system to maintain the speed of the light in the slow light medium as a constant.

It is therefore an object of an embodiment of the invention to improve optical accelerometers, gravitometers, and gradiometers.

DETAILED DESCRIPTION

An embodiment of the invention addresses the problems associated with classical optical interferometers by using slow light media in combination with counter propagation of light beams through the slow light media.

Figure 3:
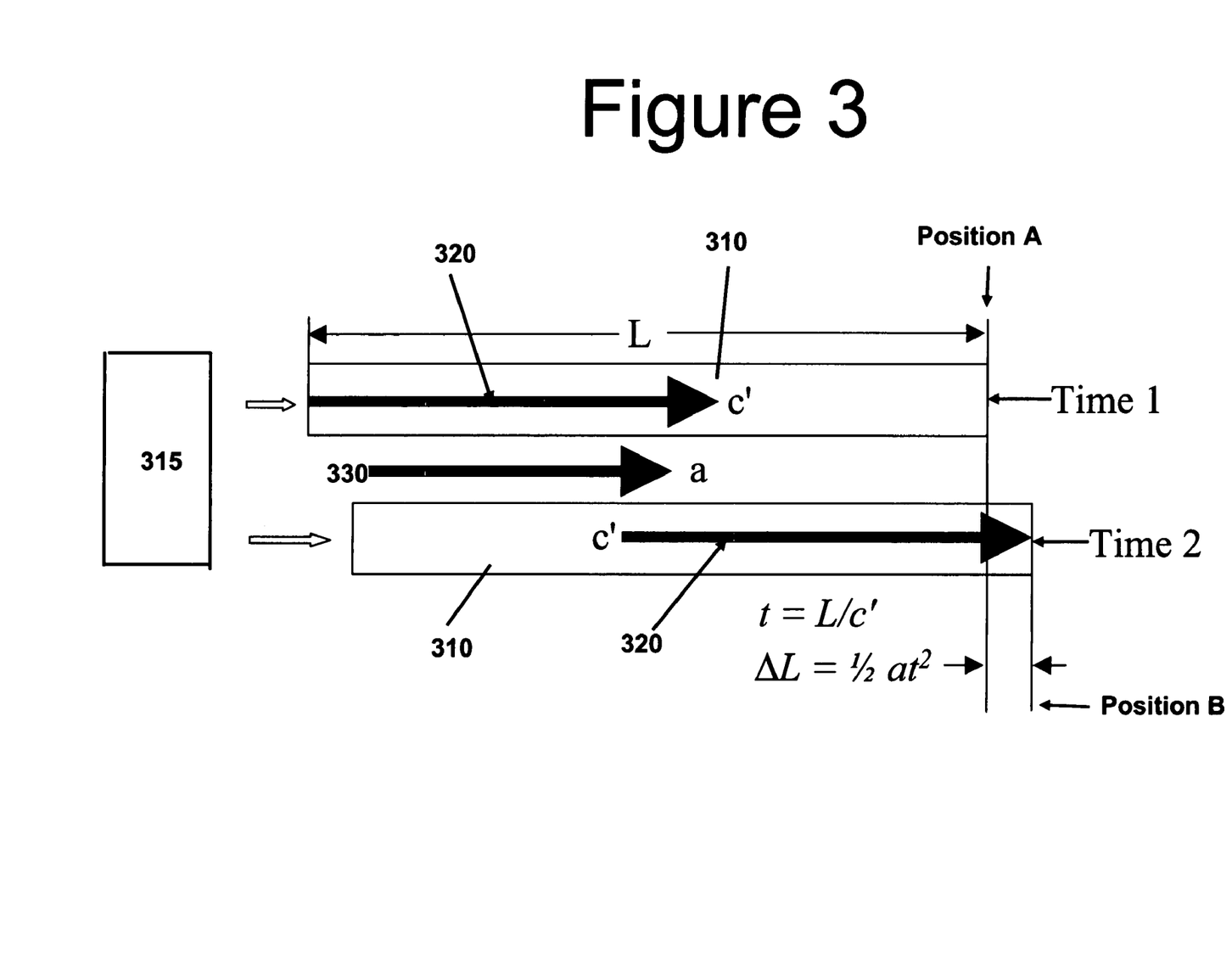
FIG. 3 illustrates a slow light medium that is accelerated over a distance.

FIG. 3 illustrates the principles of the use of a slow light medium in the invention. Specifically, FIG. 3 illustrates slow light medium 310 at position A at Time 1, and the same slow light medium 310 at position B at Time 2. In an embodiment, the slow light medium 310 has an index of refraction greater than 1.0. A light source 315 introduces a light, such as a laser, into the slow light medium. Arrow 320 indicates the direction of the light through the slow light medium, and arrow 330 indicates the direction of the acceleration of the slow light medium. The slow light medium travels from position A to position B at the same time that the light propagates through the slow light medium—effectively lengthening the distance that the light travels while it is in the slow light medium (if the slow light medium is moving in the same direction as the propagating beam of light through the slow light medium), and effectively increasing the length of time that a photon of light is resident in the slow light medium. If the slow light medium is moving in a direction opposite that of the light beam, the path length of the light beam in the slow light medium is effectively shortened. The time that it takes a photon to propagate through the slow light medium 310 is given by:

$$t = L/c'; \qquad \text{Equation No. 1}$$

wherein L is the optical path length that the light has traveled in the slow light medium 10 (relative to a fixed starting point of the slow light medium), and c' is the speed of the light beam in the slow light medium. It follows then that the additional distance traveled by a photon in the accelerating slow light medium, over and above the length of the slow light medium, can be represented by $\Delta L$. As shown in FIG. 1, this distance is represented by:

$$\Delta L = \tfrac{1}{2} a t^2; \qquad \text{Equation No. 2}$$

wherein a is the acceleration of the slow light medium, and t is the time that it takes a photon to travel from one end of the slow light medium to the other end of the slow light medium. Equation No. 2 can then be solved for acceleration as follows:

$$a = 2 \Delta L / t^2; \qquad \text{Equation No. 3}$$

Figure 4:
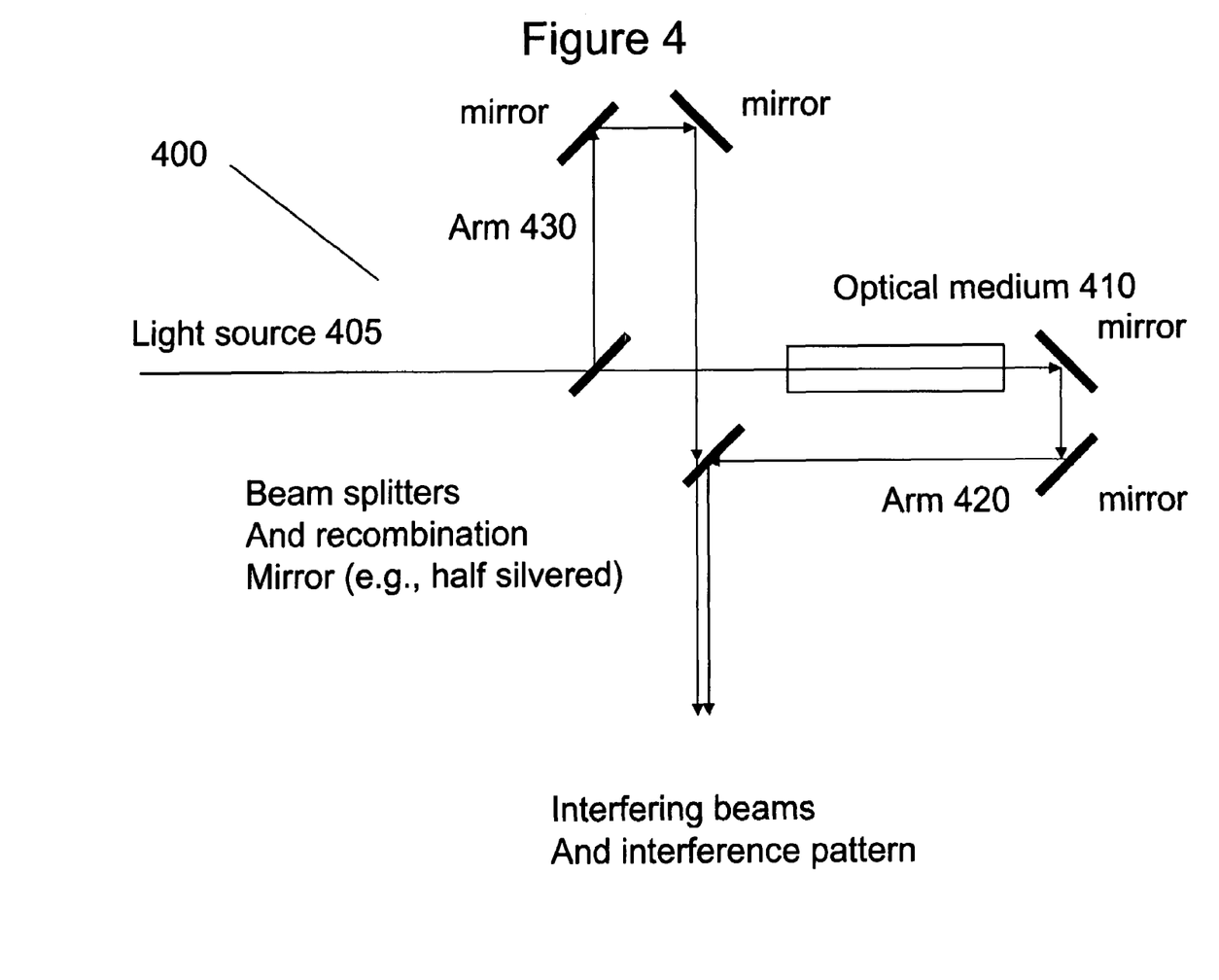
FIG. 4 illustrates an embodiment of an optical accelerometer, gravitometer, or gradiometer of the invention.

FIG. 4 illustrates an embodiment of the invention using a slow light medium such as the slow light medium that was illustrated in FIG. 3. The accelerometer 400 of FIG. 4 is based on a classic Michelson-Morley interferometer. A slow light medium 410 is place in one arm (420) of the accelerometer 400, and light from light source 405 is propagated through a circuitous path in both arms 420 and 430. The circuitous path addresses the symmetry problem associated with a classic Michelson-Morley interferometer. By breaking up the symmetry, there is no cancellation of first order acceleration effects. However, there is a potential noise problem because the change in the optical path length due to an acceleration may be appreciably less than the change in the physical length of the slow light medium due to temperature changes.

Notwithstanding the potential noise problem just discussed, directly measuring the change in optical path length of the slow light medium $\Delta L$ and/or the time t (Equation No. 3) is somewhat impractical. Because of the potential noise problems and the impracticality of measuring $\Delta L$ and t, it is therefore preferable to measure the phase shift caused by the acceleration of the light in the slow light medium. This phase shift may be thought of as being due to either the longer time the light spends in the slow light medium, or as being due to a Doppler shift being applied to the light while it is in the slow light medium. Whichever way it is viewed, the phase shift produces an output interference pattern that can be quantified, and from which the acceleration may be calculated.

If the phase shift is thought of as being due to the longer (or shorter) time that the light is resident within the slow light medium, then that difference in path length due to acceleration of the slow light medium is given a good approximation by:

$$\delta_L = (a/2) \cdot (L/V)^2; \qquad \text{Equation No. 4}$$

wherein a is the acceleration of the slow light medium, L is the length of the slow light medium, and V is the apparent speed of light in the slow light medium that is moving with a velocity of $V_0$. $V_0$ is measured relative to an observer, and it is generally zero or a very small value. V may be calculated as follows:

$$V = (V_0 + v)/(1 + (v V_0 / c^2)); \qquad \text{Equation No. 5}$$

wherein c is the speed of light in a vacuum and v is the speed of light in the slow light medium when the medium is at rest. The number of wavelengths of light is then given by:

$$n_\lambda = \delta_L / V = (a L^2 / V^3); \qquad \text{Equation No. 6}$$

and the acceleration is calculated by solving for a:

$$a = (n_\lambda V^3)/L^2; \qquad \text{Equation No. 7.}$$

Alternatively, if the phase shift is thought of a being due to a Doppler shift, the Doppler shift is given by:

$$\delta v = v \cdot (\delta V / c'); \qquad \text{Equation No. 8}$$

wherein $\delta V$ is the change in velocity due to the acceleration (a), c' is the speed of light in the slow light medium, v is the frequency of the light, and $\delta v$ is the change in the frequency of the light due to the Doppler shift. The change in velocity due to the acceleration ($\delta V$) is given by:

$$\delta V = a t = a L / c'; \qquad \text{Equation No. 9}$$

wherein L once again is the length of the slow light medium. This in turn leads to an equation for the Doppler shift as follows:

$$\delta v = (a L v / c'^2); \qquad \text{Equation No. 10.}$$

Then, the total phase shift at the output of the accelerometer is given by:

$$n_\lambda = (L/2) \cdot (1/\lambda - 1/\lambda'); \qquad \text{Equation No. 11}$$

wherein $\lambda$ and $\lambda'$ are the wavelengths of the light in the slow light medium before and after the Doppler shift respectively. The factor of 2 in the denominator reflects the fact that the Doppler shift is averaged over the length of the slow light medium. Since $\lambda$ and $\lambda'$ are equal to c/v and c/v' respectively, then $$n \lambda = (L/2c') \cdot (v - v') = (L/2c') \cdot n_\lambda = (a L^2 / 2 c'^3); \qquad \text{Equation No. 12}$$

Then, for a two way configuration (i.e. light is counter propagated in two directions through the accelerometer), the factor of 2 in the denominator may be removed, and Equation No. 12 reduces to the following:

$$n_\lambda = (a L^2 / c'^3); \qquad \text{Equation No. 13.}$$

The acceleration is then calculated by solving for a as follows:

$$a = (n_\lambda c'^3)/L^2; \qquad \text{Equation No. 14.}$$

Consequently, whether the phase shift is thought of a being due to the longer time that the light spends in the slow light medium, or it is thought of as being due to the Doppler shift, the resulting interference pattern is the same, i.e. Equation No. 6 is equal to Equation No. 12, and the calculated acceleration is the same (i.e. Equation No. 7 is equal to Equation No. 14). The interference pattern can be easily measured in any number of ways including a camera, photocell, or a human eye.

As the name implies, slow light media decrease the speed of the light while the light propagates through the media. By slowing the light down, one can see from examining Equation No. 2 that ΔL is increased (because t is increased) and from Equation No. 4 that $\delta_L$ is increased (because L is increased). By increasing the values (or range) of these parameters, more precise measurements are easier to obtain, and the sensitivity and precision of the accelerometer is increased. The use of slow light media in the accelerometer of the invention therefore solves the problem of detecting virtually immeasurable differences in the time that a photon spends in the accelerometer due to the acceleration of the accelerometer. That is, by slowing the light down, the differentials in time and optical path lengths are increased, thereby permitting ease of measurement.

In the above-described embodiments of FIGS. 3 and 4, if a single beam is propagated in a single direction through the slow light medium, the noise inherent in such a set up (e.g. by changes in the length of the slow light medium due to temperature fluctuations) may be greater than the time and optical path length differentials caused by an acceleration. That is, the change in length of the slow light medium due to temperature changes can be much greater than the change in the optical path length of a photon due to the acceleration of the slow light medium—thereby obscuring the data representing the acceleration. This problem is addressed by splitting a source beam into two beams, counter-propagating the beams through the slow light medium over the same physical path, and measuring any optical path length differential (via the interference pattern caused by the phase shift) at the recombination mirror. By counter-propagating and measuring phase shifts at the recombination mirror, the difference in the length of the medium due to a temperature change is largely canceled out, and any measurable change in the optical path length of the slow light medium is then due solely to the acceleration of the slow light medium. A counter propagation scheme also has the benefit of doubling an accelerometer's sensitivity.

Figure 5:
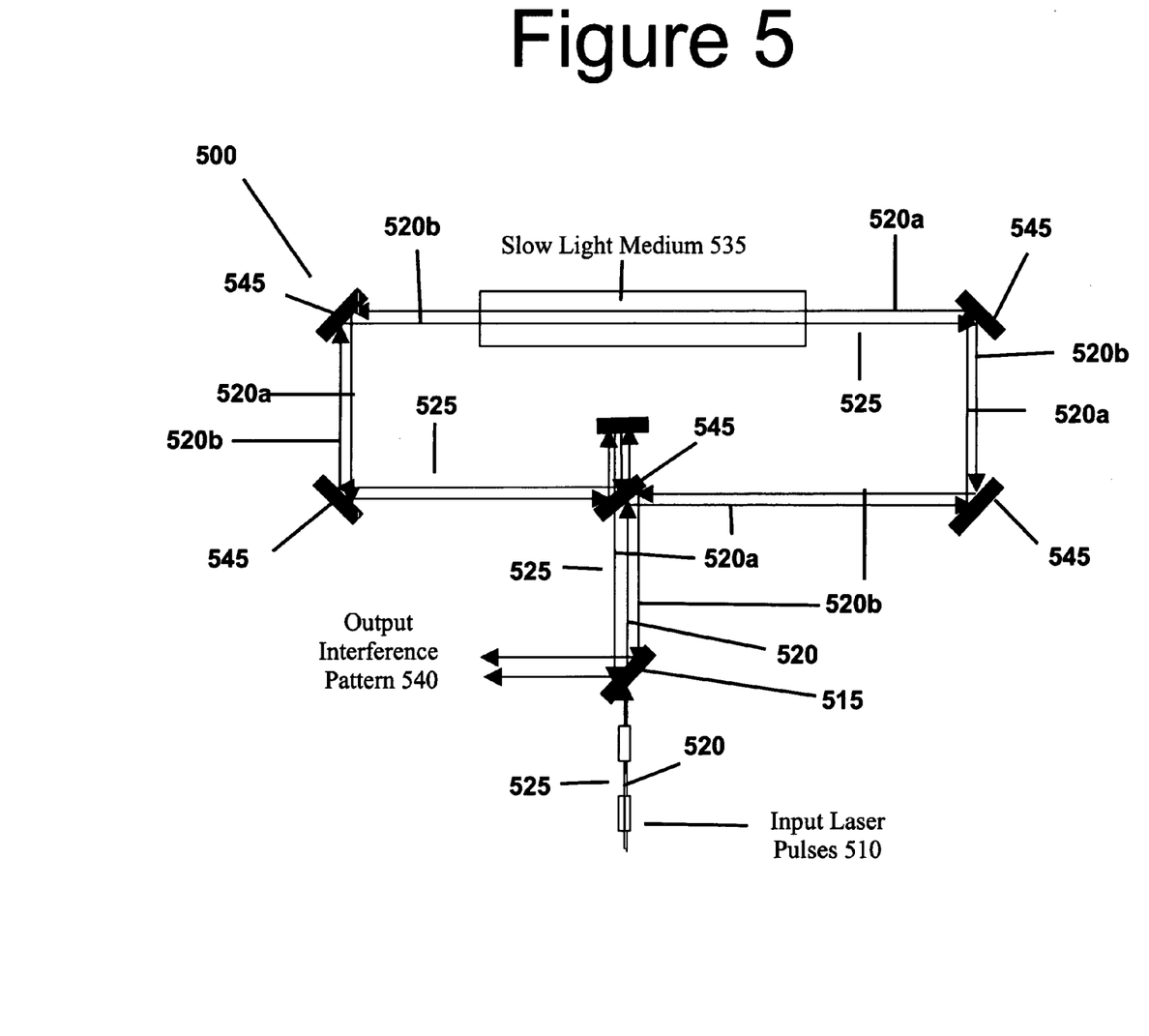
FIG. 5 illustrates another embodiment of an optical accelerometer, gravitometer, or gradiometer of the invention.

FIG. 5 illustrates one embodiment of such a counter-propagating accelerometer 500 that has an input laser 510 and a circuit 525 around which a beam 520 from such laser propagates. Input laser 510 directs a beam 520 into a mirror 515 that functions as both a beam splitter and a recombination mirror. The mirror 515 splits the beam 520 into segments 520a and 520b. Beam segments 520a and 520b propagate around the circuit 525 of the accelerometer 500, through slow light medium 535 and reflect off mirrors 545. Beam segments 520a and 520b however propagate in opposite directions, thereby traveling the same distance and canceling out any change in length of the slow light medium 535 due to noise. Upon completion of the circuit 525, the beams are recombined at mirror 515, and are reflected to a point 540 at which the phase shift ($n_\lambda$) can be measured (e.g. with a photocell). From the phase shift, the acceleration may be calculated via Equation Nos. 7 or 14 as explained supra.

Figure 6:
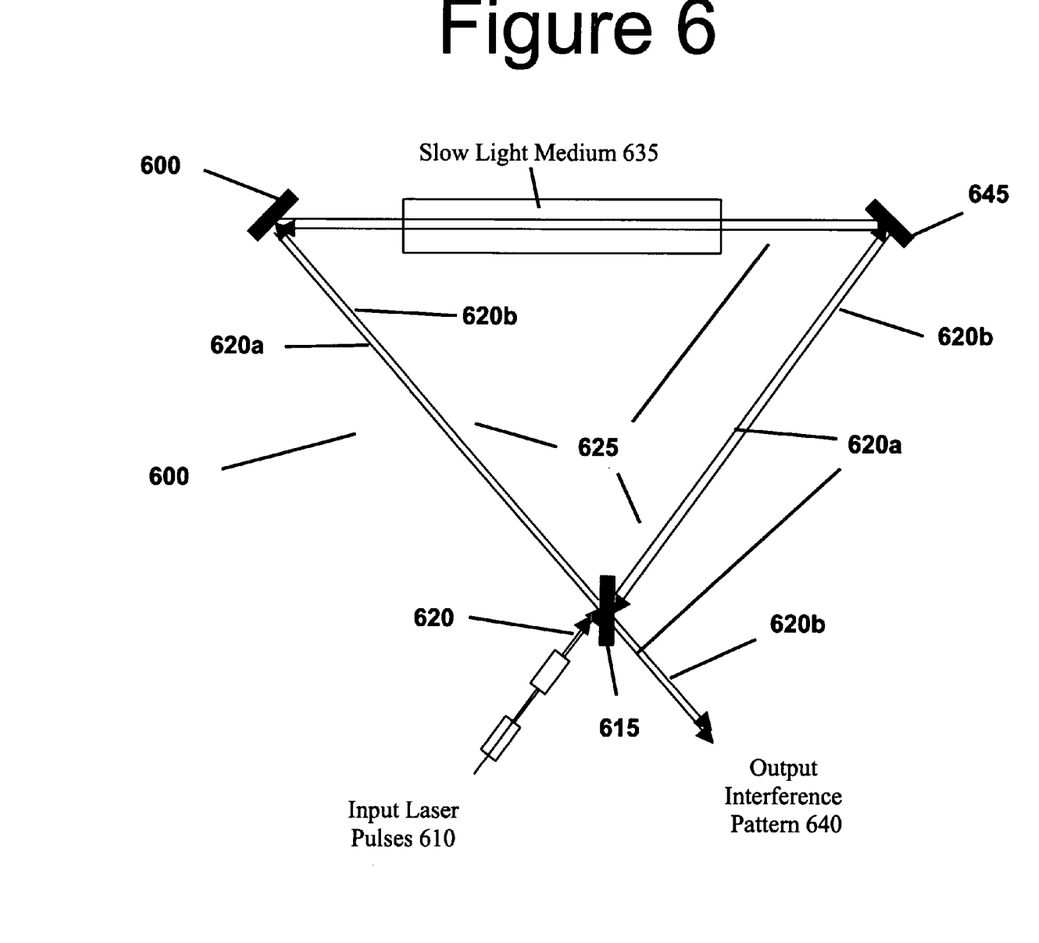
FIG. 6 illustrates another embodiment of an optical accelerometer, gravitometer, or gradiometer of the invention.

Similarly, FIG. 6 illustrates another embodiment of a counter-propagating accelerometer. Specifically, an accelerometer 600 has an input laser 610 and a circuit 625 around which a beam 620 from such a laser can propagate. Input laser 610 directs the beam 620 into a mirror 615, which functions as both a beam splitter and a recombination mirror. The mirror 615 splits the beam 620 into segments 620a and 620b. Beam segments 620a and 620b propagate around the circuit 625 of the accelerometer 600, through slow light medium 635, and reflect off mirrors 645. Beams 620a and 620b however propagate in opposite directions, thereby traveling the same distance and canceling out any change in length of the slow light medium 635 due to noise. Upon completion of the circuit 625, the beams are recombined at mirror 615, and are reflected to a point 640 at which the phase shift ($n_\lambda$) can be measured. From the phase shift, the acceleration may be calculated as explained supra. While FIGS. 5 and 6 illustrate two embodiments in which a light beam is counter propagated in an accelerometer, those of ordinary skill in the art will realize that there are numerous ways such a counter propagation system could be set up.

Figure 7:
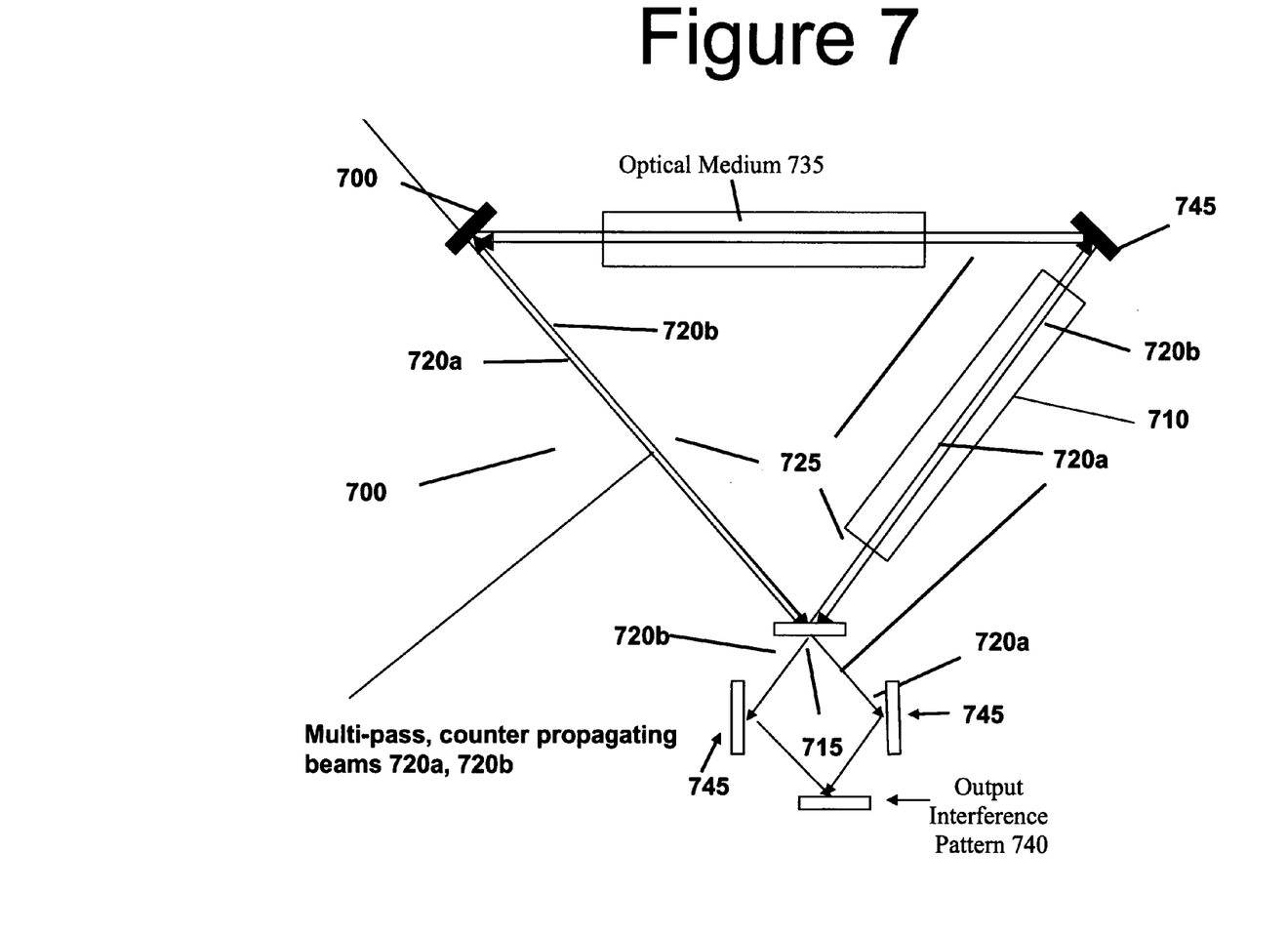
FIG. 7 illustrates another embodiment of an optical accelerometer, gravitometer, or gradiometer of the invention.

FIG. 7 illustrates an embodiment of the invention that uses a classical prism with a normal index of refraction in lieu of a slow light medium (with an index of refraction greater than 1.0). An accelerometer 700 consists of a circuit 725 with optical paths 720a and 720b, mirror 715, and prism or optical medium 735. A laser 710 is inserted into the optical path of the circuit 725 and injects two beams of light (or a single beam split into two beams of light) into the circuit 725. The two beams of light counter-propagate around the circuit 725 multiple times (on the order of tens of thousands of times or more). As described with the embodiments of FIGS. 5 and 6, an acceleration applied to the embodiment of FIG. 7 will alter the length of the optical paths depending on the acceleration and the direction of propagation of the laser. This produces the phase shifts and expected interference fringes 740 as with the embodiments that utilize slow light media. An effect of this embodiment involves resonance. As the optical paths shift, the laser cavity will come in and out of resonance. When the beams cancel at the laser the lasing will be quenched; when they are in phase, lasing will occur.

In contrast to the embodiments using slow light media, the spacing of the lines in the output interference pattern in the embodiment of FIG. 7 is determined by the laser wavelength, not the acceleration alone. In the embodiment of FIG. 7, the acceleration determines the strength and number of lines in the output interference pattern. The acceleration could then be measured in any number of ways that analyze the strength and number of lines, including via Fourier spectrometry.

In embodiments of the invention that use a slow light medium, it is preferred that a medium capable of electromagnetically induced transparency (EIT) is used as the slow light medium. Many solid crystals, such as a ruby crystal, are typically capable of electromagnetically induced transparency. In the EIT medium, the beam that propagates through the accelerometer and which is used to determine the acceleration is referred to as the probe beam. A second beam, referred to as the pump beam, when of proper wavelength and intensity and directed onto the slow light medium in the accelerometer, makes the slow light medium transparent to the probe beam (via the elimination of resonant absorption), and also slows down the probe beam. The pump wavelength saturates and blocks the probe wavelength transitions, thereby preventing the probe wavelengths from being absorbed, and thereby inducing transparency in the material in a narrow spectral window surrounding that wavelength. A common feature of EIT materials that is exploited to produce slow light media is a rapid change in the phase velocity of light near the absorption edge of the material. This rapid change in phase velocity results in dramatic reductions in the group velocity for the light. The probe beam then propagates through the medium at a speed much less than the vacuum speed of light. Depending on the EIT medium used, the proper intensities and wavelengths of the probe and pump beams can be determined by one of ordinary skill in the art.

It should be noted that the counter-propagating laser probes may cause self-modulation for some EIT systems, which may cause the counter-propagating probe beams to interact with each other. This situation could lead to reduced accuracy and/or precision because of noise or other sources of error. However, self modulation can be avoided by using lower intensities of light. Self modulation can also be avoided by refraining from EIT schemes that are known to exacerbate self modulation (such as EIT systems that do not require pump beams).

Since EIT devices are somewhat sensitive to magnetic and electric fields, in an embodiment the accelerometer is shielded from such fields. However, in another embodiment, a magnetic field may be used to actively cancel the phase shifts of the propagating beams due to the acceleration of the slow light medium. In such a system the acceleration could be determined by measuring the strength of the magnetic field required to shift the interferometer to null. This is referred to as a null type sensor system.

Figure 8:
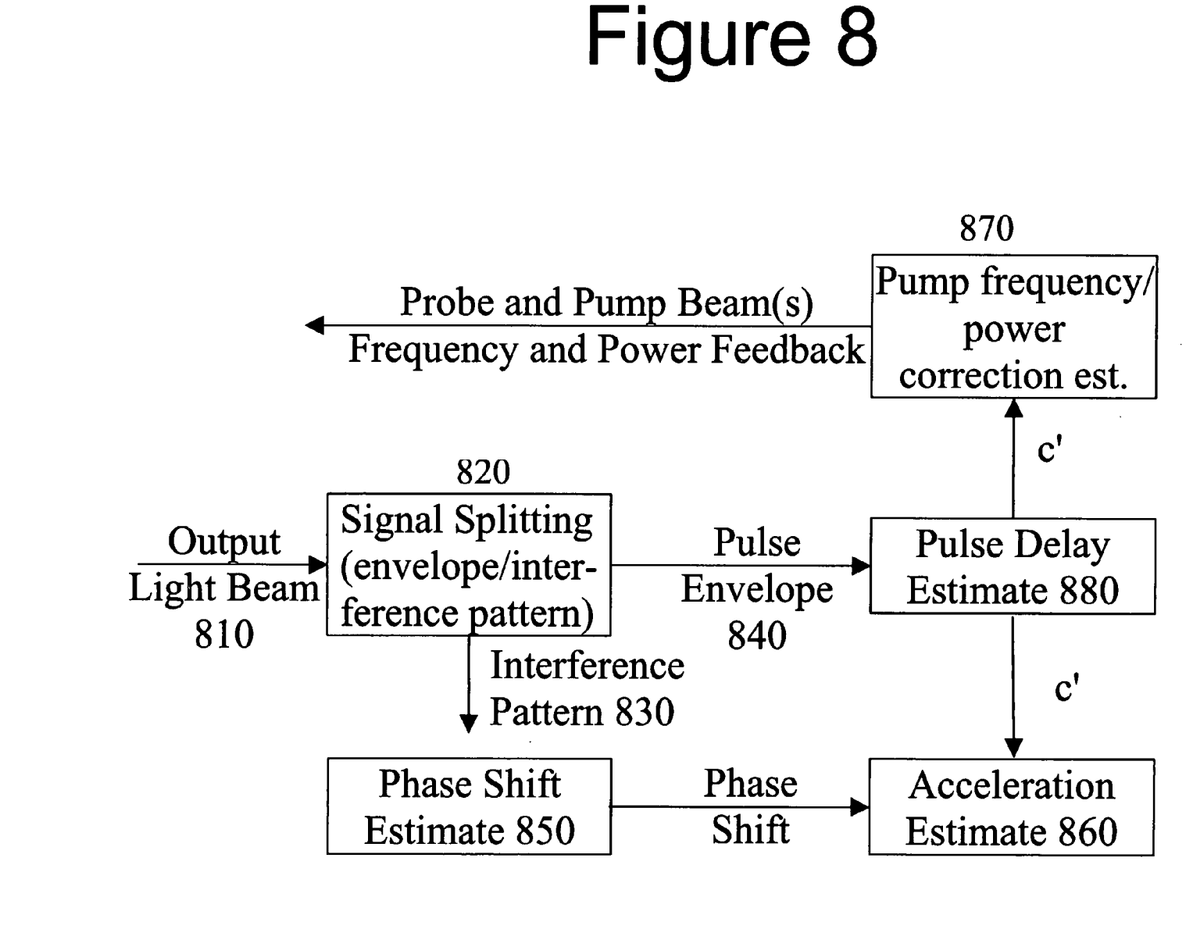
FIG. 8 illustrates a feedback and control system that can be used in connection with an optical accelerometer, gravitometer, or gradiometer of the invention.

In another embodiment of the invention, active feedback is used to maintain the speed of the light in the slow light medium as a constant (the speed of the light through the slow light medium will change as the temperature of the slow light medium changes). Such feedback and control is necessary to obtain stable operation and to make absolute acceleration measurements. An example of the control flow of such a system is illustrated in FIG. 8. Referring to FIG. 8, a light beam 810 is directed into a slow light medium. The signal is split into an interference pattern segment 830 and a pulse emitter segment 840 at point 820. The interference pattern segment 830 is counter propagated through the accelerometer system as explained supra, a phase shift is determined at point 850, and an acceleration calculated at 860. Concurrently, the pulse envelope segment 840 is propagated through the accelerometer. The velocity of the pulse envelope 840 can be easily calculated via the Pulse Delay Estimate 880 from the measured distance that it travels in the accelerometer, and the time that it takes to travel that distance. The velocity c' can then be kept nearly constant, irrespective of changes in it caused by such factors as temperature changes, by altering the pump frequency or pump intensity at 870.

There can be a variety of feed back systems implemented in connection with the accelerometer of the invention, and each system can differ in certain details depending upon the mechanism used to achieve slow light propagation. In each feedback system however, the transit time for the light pulses should be measured, and the slow light media should be controlled to achieve some predetermined propagation delay in the active slow light media. The accuracy of the accelerometer directly depends on the accuracy of the delay time measurements. Current technology can achieve delay measurements on the order of $10^{-9}$ to $10^{-8}$ seconds.

In addition to the feed back system like the one in FIG. 8, another embodiment of the accelerometer of the invention has a temperature control system to maintain the temperature of the accelerometer, and in particular, the slow light medium of the accelerometer. Temperature maintenance and stability maintains the dimensional stability of the accelerometer, especially that of the slow light media, thereby lessening the need for a feedback system.

The equivalence principle, from the theory of general relativity, permits application of the invention, predominantly described herein as it relates to acceleration, to gravitational fields as well (gravitometers and gradiometers). The equivalence principle states that there is no local experiment that can distinguish between a linear acceleration and a uniform gravitational field. This implies that any sensor capable of detecting an acceleration is also capable of detecting a gravitational field. Therefore, while the invention is described predominantly as it relates to the measurement of acceleration, the invention applies equally well to gravitational fields and the measurement thereof. Additionally, while accelerometers and gravitometers measure acceleration or gravitational fields, gradiometers measure the first derivatives of these quantities. The usual approach to implementing a gravitational gradiometer is to place two sensors in close proximity to one another, and then take the difference of their readings as a proxy for the derivative.

While the invention has been described in its preferred and other embodiments, it is to be understood that the words used are words of description rather than limitation and that changes may be made within the purview of the appended claims without departing from the true scope and spirit of the invention in its broader aspects.

The invention claimed is:

1. An optical accelerometer comprising:
a light source;
a beam splitter;
a slow light medium;
a plurality of mirrors, said beam splitter, said plurality of mirrors, and said slow light medium forming a circuit; and
means to detect an output interference pattern;
wherein said beam splitter is configured to split said light source into a first beam to propagate around said circuit in a first direction and a second beam to propagate around said circuit in a second direction; and
wherein said means to detect an output interference pattern is configured to detect a phase shift between said first beam and said second beam.

2. The optical accelerometer according to claim 1, wherein an acceleration is determined from said interference pattern.

3. The optical accelerometer according to claim 2, wherein said acceleration is calculated by the following equation:

$$a = (n_\lambda V^3)/L^2$$

wherein a represents said acceleration, $n_\lambda$ a number of wavelengths of light in said slow light medium, V represents the speed of light in said slow light medium, and L represents the length of said slow light medium.

4. The optical accelerometer according to claim 1, wherein one or more of said mirrors is a recombination mirror.

5. The optical accelerometer according to claim 1, wherein said means to detect an output interference pattern comprises a photo detector.

6. The optical accelerometer according to claim 5, wherein said photo detector comprises a photocell.

7. The optical accelerometer according to claim 5, wherein said photo detector comprises a video camera.

8. The optical accelerometer according to claim 1, wherein said accelerometer is used as a gravitometer.

9. The optical accelerometer according to claim 1, wherein said accelerometer is used as a gradiometer.

10. The optical accelerometer according to claim 1, further comprising a feedback mechanism to maintain constant the speed of light in said slow light medium.

11. The optical accelerometer according to claim 10, wherein said feedback system comprises:
a signal splitter;
a phase shift estimator coupled to said signal splitter;
an acceleration estimator coupled to said phase shift estimator;
a pulse delay estimator coupled to said phase shift estimator and said signal splitter; and
a means to adjust the frequency or intensity of a pump beam, said means receiving input from said pulse delay estimator.

12. The optical accelerometer according to claim 1, wherein said light source is a laser.

13. The optical accelerometer according to claim 1, further comprising a means to generate a magnetic field, said magnetic field canceling said phase shift caused by said acceleration.

14. The optical accelerometer according to claim 1, further comprising a temperature control mechanism.

15. The optical accelerometer according to claim 1, further comprising a shield to protect said accelerometer from a magnetic field.

16. An optical accelerometer comprising:
a light source;
a beam splitter;
a slow light medium;
a plurality of mirrors, said beam splitter, said plurality of mirrors, and said slow light medium forming a circuit; and
means to detect a shift in an output interference pattern of light emitted from said light source that traverses said circuit.

17. The optical accelerometer according to claim 16, further comprising a means to detect a time differential between light propagating through said slow light medium and light propagating through a vacuum, and further comprising means to determine a change in optical path length in said slow light medium.

18. The optical accelerometer according to claim 17, wherein said acceleration is calculated by the following equation:

$$a = 2\Delta L/t^2$$

wherein $\Delta L$ is an additional distance traveled by a photon in said slow light medium when it is accelerating, and t is the time that it takes a photon to travel through said slow light medium.

19. The optical accelerometer according to claim 16, further comprising a magnetic field.

20. The optical accelerometer according to claim 17, further comprising means to control the ambient temperature of an accelerometer.

21. A method to measure acceleration, comprising the steps of:
providing a light source;
splitting said light source into a first beam and a second beam;
passing said first beam through a slow light medium in a first direction;
passing said second beam through said slow light medium in a second direction; and
measuring a phase shift between said first beam and said second beam.

22. The method to measure acceleration according to claim 21, further comprising calculating said acceleration using the following equation:

$$a = (n_\lambda V^3)/L^2$$

wherein a represents said acceleration, $n_\lambda$ a number of wavelengths of light in said slow light medium, V represents the speed of light in said slow light medium, and L represents the length of said slow light medium.

23. An optical accelerometer comprising:
a laser;
an optical path;
an optical slow light medium;
a plurality of minors; and
a means to detect an output interference pattern;
wherein said laser is configured to counter-propagate two beams around said optical path;
and further wherein said means to detect an output interference pattern is configured to detect a phase shift between said two beams.

24. The optical accelerometer according to claim 23, wherein said two beams propagate around said optical path on the order of tens of thousands of times.

* * * * *